United States Patent [19]

Prikryl

[11] Patent Number: 4,509,818
[45] Date of Patent: Apr. 9, 1985

[54] HOLOGRAM SYNTHESIS

[76] Inventor: Ivan Prikryl, 2170 Cram Pl. #1, Ann Arbor, Mich. 48105

[21] Appl. No.: 331,867

[22] Filed: Dec. 17, 1981

[51] Int. Cl.³ .............................................. G03H 1/08
[52] U.S. Cl. ................................................... 350/3.76
[58] Field of Search ................ 350/3.75, 3.76, 3.77, 350/3.69

[56] References Cited

U.S. PATENT DOCUMENTS

| 3,884,545 | 5/1975 | Kasahara et al. | 350/3.76 |
| 3,985,419 | 10/1976 | Matsumoto et al. | 350/3.76 |
| 4,339,168 | 7/1982 | Haines | 350/3.76 |
| 4,364,627 | 12/1982 | Haines | 350/3.76 |
| 4,421,380 | 12/1983 | McGrew | 350/3.78 |
| 4,429,946 | 2/1984 | Haines | 350/3.76 |
| 4,445,749 | 5/1984 | Benton | 350/3.76 |

OTHER PUBLICATIONS

Sincerbox, G. T., "Formation of Optical Elements by Holography", IBM Tech. Disclosure Bulletin, vol. 10, No. 3, Aug. 1967, pp. 267,268.

Primary Examiner—Bruce Y. Arnold
Attorney, Agent, or Firm—Stephenson and Boller

[57] ABSTRACT

The invention relates to hologram synthesis using a two-dimensional lattice of basic holograms, each basic hologram being formed from a two-dimensional transparency. It provides a synthetic field hologram that has a diffraction efficiency unimpared by the number of basic holograms employed. The hologram may be reconstructed in white light. The method and hologram are useful in making and reconstructing holographic land maps.

4 Claims, 3 Drawing Figures

HOLOGRAM SYNTHESIS

BACKGROUND AND SUMMARY OF THE INVENTION

The present invention relates to hologram synthesis from two-dimensional (2-D) transparencies and is particularly concerned with a new and improved method and hologram for reconstructing three-dimensional (3-D) objects from the multiple views of the objects recorded separately.

Large outdoor scenes such as monuments, buildings, ships etc. cannot be directly recorded on usual holograms. However, there are methods of 3-D hologram synthesis from 2-D photographic transparencies that make multiplex holograms from which 3-D outdoor objects can be reconstructed.

In priciple there are two basic techniques for constructing the multiplex holograms. Individual basic holograms are multiplexed either on a whole holographic plate overlapping each other or on adjacent small areas contiguous over a holographic plate. These areas are mostly vertical stripes, but theoretically small rectangles arranged in a 2-D lattice may be used instead of the stripes. Methods that are something between the two above-mentioned techniques have been also applied in practice.

The method where the individual basic holograms overlap each other suffers from the serious fall-off of the diffraction efficiency with the increasing number of multiplexed holograms and is essentially useless from a practical standpoint. Attempts to alleviate this drawback, for instance by hologram copying or by using litium niobate for hologram recording, are not satisfactory enough.

The stripe recording technique does not suffer from the above mentioned drawback. However, there are other shortcomings in this technique. First, the application of the stripe holograms brings the loss of one of two parallaxes. This means that a holographic stereogram constructed by this technique can reconstruct an image with only one parallax. It is the horizontal parallax which is mostly recorded. Second, the plane of such a hologram is the plane of adjacent pupils for the direction perpendicular to the stripes. For viewing such a multiplex hologram the eye pupil ought to be placed as close to the hologram as possible so as not to reduce the impression from the stereoscopic reconstruction. When the eye pupil is not close enough to this type of multiplex hologram, the different parts of a reconstructed object are viewed through different individual basic holograms (stripes) for a static position of the eye pupil and this fact causes the mentioned reduction of the impression from the stereoscopic reconstruction. The eye pupil at the plane of the hologram would have represented the optimum case for viewing the reconstructed synthetic image. Of course, this can never be achieved because of the impossibility of placing the eye onto a large mechanical plate. Moreover, it is obvious that it would not be suitable to view the hologram from some excessive distance. However, there is another reason which constrains one to view this type of hologram from a long distance. The other reason is connected with white-light reconstruction and the rainbow holographic technique.

The white-light reconstruction of a hologram (which is a necessary condition for certain commercial purposes) can be realized by using a reflection hologram or by using some version of rainbow holography. The rainbow method unconditionally requires placing the pupil of an imagery for the direction perpendicular to the "holographic grating" far enough from the holographic plate. Consequently, we must also place the eye pupil viewing the reconstruction far enough from the hologram. This means that from the point of view of the successful rainbow reconstruction, the requirement of placing an eye far from the hologram is contrary to the requirement for a fully successful steroscopic reconstruction which requires placing the eye as close to the hologram as possible. In practice, the priority is given to the former requirement so that the steroscopic impression is partially lost. Of course it is impossible to view a reflection hologram from a vicinity without obstructing the reconstruction beam, so that the version replacing the rainbow method by a reflection hologram would not bring an improvement.

To summarize, up to this time there has not been a method for making synthetic holograms from 2-D transparencies which would quite successfully reconstruct 3-D objects either in white-light or with help of only a laser.

The present invention is directed to a new synthetic hologram and the method of its creation. This hologram is referred to as the synthetic field hologram and for shortness designated by the letters SFH. With help of the disclosed method and SFH it will be possible to record and reconstruct generally in white-light any 3-D object without loss of any parallax. This means, that with this invention it will be also possible to make 2-D holographic maps providing the 3-D images of recorded territories. The reconstructed synthetic image of an object made with a required magnification and with or without changed parallaxes can be one-color or full-color. The most suitable distance for viewing the SFH can be a priori selected. The diffraction efficiency of the SFH is not dependent on the number of basic holograms, i.e. on the number of the recorded views of the objects, and the reconstructed image can be viewing without vignetting and with the maximum possible impression from the volume reconstruction. It is also possible for a series of SFH's to be readily made.

The aforementioned features, advantages and benefits of the invention, along with additional ones, will be seen in the ensuing description of one possible embodiment and claims which should be considered in conjunction with the accompanying drawing.

The drawing promotes easier understanding of the embodiment of the invention showing only one of many possible arrangements that can be considered for the practicing the invention.

DESCRIPTION

Figure 1:
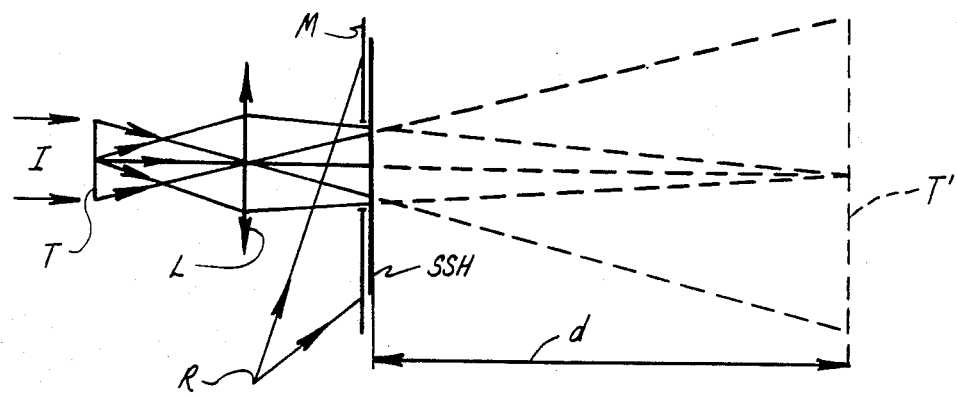
FIG. 1 is a diagramatic view illustrating a part of one step of the invention.

For purposes of explaining principles of the invention let it be assumed that it is desired to create a holographic map, i.e. a synthetic hologram of a territory serving as the large outdoor object. First multiple views of the selected territory are photographically recorded.

This recording can be done by taking pictures of the same part of the territory from different positions of a camera placed for instance at the intersections of a fictitious square net at a plane high enough above the territory. The image views are taken from different directions on individual frames of a film. These directions are generally distributed in the 3-D space so that the information about the changes of the object profile in both the independent directions have been photographed. A sufficient number of views are used so that the desired information about the changes of the object profile in both the independent direction have been obtained. The suitable distance of the camera from the object and the spacing between individual points at which the photographs are taken will depend upon the object size and its profile. A black-white or color film is required for one-color or color reconstruction, respectively.

Once these photographic images of the object have been taken they are used to construct a synthetic hologram referred to as a subsidiary synthetic hologram and for shortness designated by the letters SSH. All the frames are successively recorded on a holographic plate to yield, preferably, a transmission SSH. The SSH consists of the individual basic holograms where each basic hologram records the image of the object from one particular view. The individual basic holograms are arranged in a two-dimensional structure on the plate of the SSH in such a way that all reconstructed together yield the real synthetic image of the object, which would evoke the impression of the 3-D copy of the object if it had been possible to view this image from the direction of light propagation. The most suitable distance of the real synthetic image from the SSH equals the distance we want to use for viewing a final reconstruction from the synthetic field hologram, or SFH, which will be described in detail later on. This distance will be referred to as the distance d. Further, we will refer to the whole synthetic field of the synthetic image of the object as the synthetic signal field or briefly only as the signal field. Three SSH's in the three different wavelengths must be constructed if a final reconstruction from the SFH is required in color.

One important aspect of the invention lies in the fact that, in principle, the basic holograms don't overlap each other on the surface of the SSH so that the diffraction efficiency of the SSH is not decreased due to mutual overlapping of the basic holograms. Moreover, the creation of the synthetic signal field is made in such a way that the pupils of the individual imagings of the synthetic signal field are directly the basic holograms on the SSH for both the independent directions perpendicular to the beams. The surface of these pupils, which is given by the surface of the SSH during construction and reconstruction of this hologram, will be referred to as the pupil surface, regardless of whether the SSH is present or not in the further steps of the invention. There are also two subsidiary conditions for obtaining the best possible final reconstruction from the SFH. First, each basic hologram should be equal to or larger than the eye pupil which will view the final reconstruction. This eliminates blurring of the final reconstruction. Secondly, all the basic holograms should be contiguous, i.e. they should be immediately adjacent each other without any gaps and with no overlapping. Gaps between the basic holograms would contribute to flickering of the final reconstruction during viewing and overlapping of the basic holograms would create dark moire fringes over the reconstructed synthetic image (due to double reconstruction).

FIG. 1 illustrates a possible recording of one basic hologram on the SSH. A coherent wave I illuminates a transparency T containing the photographic image of one view of the object. The lens L yields the image T' of transparency T at the distance d from the plate of the SSH. The basic hologram of the SSH is created with help of the reference wave R. The mask M protects the recording medium of the SSH except the area of one basic hologram being recorded. The distance d and the magnitude of the image T can be selected by using suitable parameters of the lens L. The lens L should be as close as practically possible to the plate of the SSH in order that the lens exit pupil be not too far from the SSH where the pupil surface of the synthetic signal field is.

For recording each new basic hologram from each new transparency the plate of the SSH together with the reference source R are shifted and tilted as one rigid body (with respect to the lens L and the transparency T) in such a way that a later simultaneous reconstruction of all the basic holograms of the SSH with help of one coherent reconstruction source results in the real synthetic image of the 3-D object without aberrations in the distance d from the SSH. The mask M is always tilted but not shifted together with the plate of the SSH. The construction of the SSH of the above prescribed properties can be also realized in any other suitable way than the specific one disclosed here.

Once the SSH has been constructed the invention involves the subsequent use of the synthetic signal field reconstruction from the SSH as the optical coherent signal for construction of a further transmission or reflection hologram which is referred to as the subsidiary synthetic field hologram. For shortness we will designate this hologram by the letters SSFH. The distance of the SSFH from the SSH would not be smaller than the distance d in order that the real synthetic image reconstructed from the SSH is not behind the plate of the SSFH. The only function of the SSFH is to reverse the propagation of light of the synthetic signal field. This is realized by the technique of "reverse reconstruction" in which the reference wave propagating in the reverse direction (i.e. impinging on the SSFH from the opposite side) is used for reconstruction of the SSFH. Generally, only the signal beam propagating in the direction from the synthetic image to the pupil surface can evoke the successful impression of the required reconstruction. If the technique of "reverse reconstruction" can not be successfully applied on a color reconstruction of a final reflection SFH we construct the SSFH. However, for at least one color reconstruction the technique of "reverse reconstruction" can be applied directly on the final reconstruction of the SFH, regardless of whether it is transmission or reflection hologram, and in such a case the step of the construction of the SSFH can be skipped. The SSFH, or the SFH if made directly from the SSH, may be considered as a master synthetic field hologram.

The SSFH has an important property that will also be important for the final SFH. The individual basic signals from the basic holograms of the SSH can be arbitrarily overlapped on the surface of the SSFH or final SFH without affecting the diffraction efficiency of the SSFH or SFH. This phenomenon of the invention is reached by the simultaneous reconstruction of all the basic holograms of the SSH.

Figure 2:
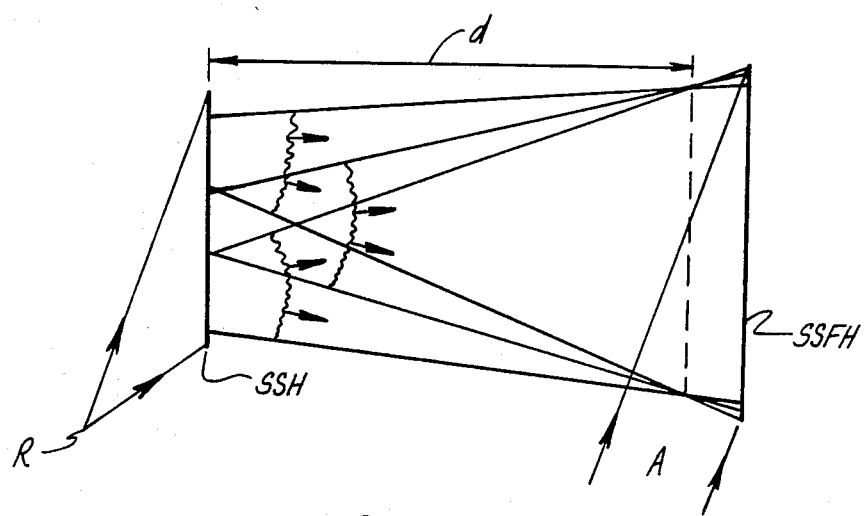
FIG. 2 is a diagrammatic view illustrating the next step.

One possible variation of the construction of the SSFH is illustrated in FIG. 2 where only three basic holograms on the SSH are considered. R is the coherent reconstruction field reconstructing the synthetic signal field from the SSH. A coherent reference wave for creating the transmission SSFH is designated by the letter A. The broken line in front of the SSFH shows the position of the real synthetic image.

Three SSFH from three SSH have to be constructed for three different wavelengths when the final reconstruction from the SFH is to be in full color.

Having made SSFH we use the "reverse reconstruction" of this hologram for obtaining the reversely propagated synthetic signal field. This field is then used for the construction of the final SFH. The most suitable position of the plate for recording the SFH is the position in which the real synthetic image reconstructed from the SSFH, or directly from the SSH when the construction of the SSFH can be skipped, is focused on the plate of the SFH. Only in this case the synthetic image reconstructed later from the SFH will not be vignetted. Preferably, the SFH is a reflection type of hologram which allows its reconstruction in white light. If the color reconstruction of the SFH is required three SSFH's each recording the synthetic signal field in a different wavelength have to be successively applied for making one relfection SFH. The special processing of the reflection SFH is necessary for keeping the emulsion from shrinking and ensuring a true color reconstruction when the recording medium of the SFH is a photographic emulsion.

Figure 3:
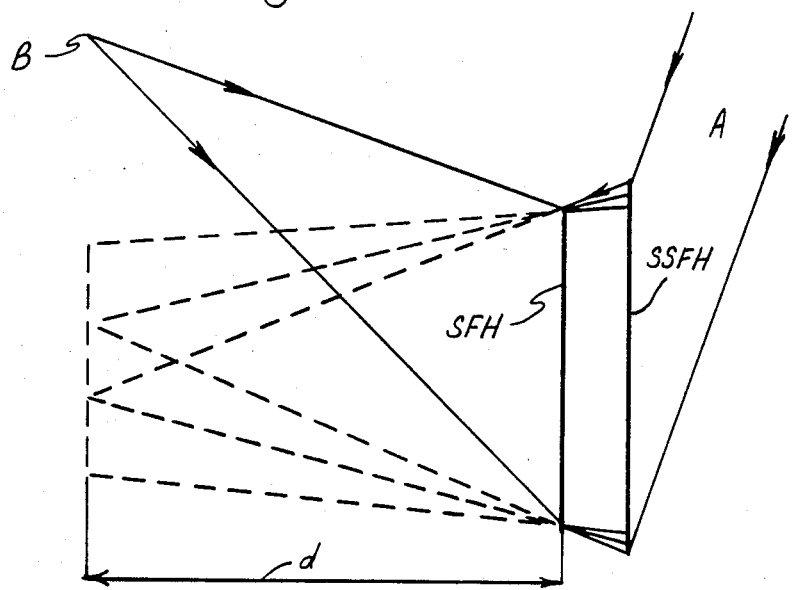
FIG. 3 is a diagrammatic view illustrating a further step.

The step of the construction of the SFH from the SSFH is sketched in FIG. 3. The coherent reconstruction wave A reconstructs the reversely propagated signal field which is recorded on the reflection SFH with help of the coherent reference beam B.

The SFH has all the advantages which a "classical" synthetic hologram that has the individual basic holograms mutually overlapped over its surface would have been able to provide if its diffraction efficiency had been satisfactory.

Be it noted, that from the SSFH or directly from the SSH can easily be prepared an arbitrary number of the final SFH so that, for instance, an arbitrary number of 2-D holographic maps providing 3-D images of a territory can easily in made.

The reflection SFH can be reconstructed in white-light. The best recommended distance for the viewing of any SFH is the distance in which the eye pupil lies at the pupil surface of the synthetic field, i.e. in our case the distance d.

What is claimed is:

1. The method of making a final hologram from which can be reconstructed a three-dimensional image of a three-dimensional object without loss of either of two possible independent parallaxes comprising simultaneously reconstructing basic holograms arranged in a two-dimensional lattice without any substantial mutual overlap of these basic holograms, each basic hologram carrying an image of the object as viewed from a different direction; simultaneously reconstructing these basic holograms such that, in some location, the image beams reconstructed from these basic holograms are mutually and substantially fully overlapped; and placing a recording medium for the final hologram in the location where these image beams are mutually and substantially fully overlapped.

2. Any hologram constructed through use of method of claim 1.

3. Any hologram which is a reproduction derived from the hologram of claim 2.

4. The method as set forth in claim 1 in which the three-dimensional object is a land area.

* * * * *